June 21, 1927.  C. E. LOOSE  1,633,114

SAFETY CHECK DEVICE

Filed May 11, 1923

Inventor
Clyde E. Loose
By Verman E. Hodges
His Attorney

Patented June 21, 1927.

1,633,114

UNITED STATES PATENT OFFICE.

CLYDE E. LOOSE, OF BALTIMORE, MARYLAND.

SAFETY CHECK DEVICE.

Application filed May 11, 1923. Serial No. 638,377.

My invention relates to a safety check device, the object being to provide a device of the character named to be used in the line or lines of any fluid pressure, and more particularly hydraulic brake systems.

In the event that any one of several brakes or connections bursts or leaks, it is an object of this invention automatically to check that particular line and permit the other brakes to continue their normal operation, or to function normally just as though there had been no break.

This invention is applicable to any hydraulic system of brakes, and can be variously applied, and the illustration is merely of one or more typical constructions that will perform the functions intended.

Figure 1:
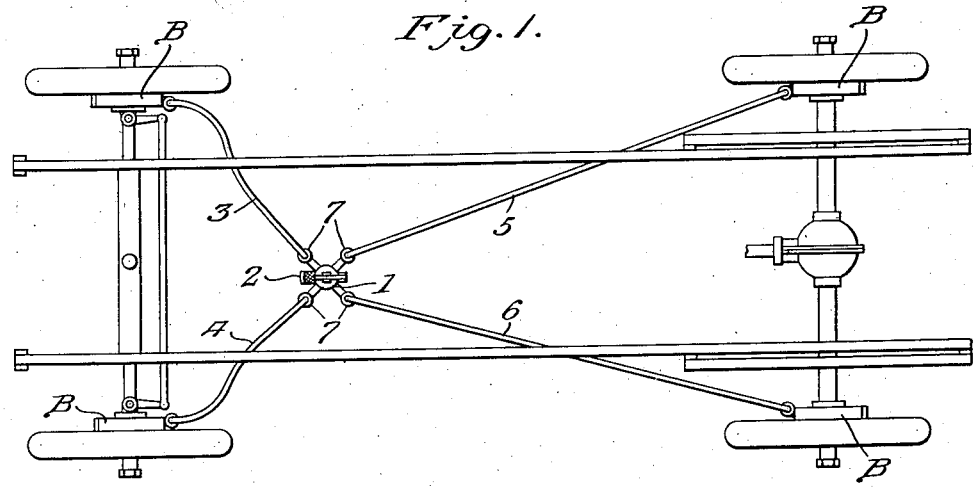
Fig. 1 is a diagrammatic view showing the invention applied to the chassis of an automobile.

The numeral 1 represents a source of fluid supply; 2 is a brake lever; and the pipes 3, 4, 5 and 6 lead to the four brake mechanisms B of the automobile. My improved check device is placed in each one of these pipes, and it consists of a cylinder 7, of which four are shown. In the particular installation illustrated, these are placed vertically, the lower end is connected by a fitting 8 with the lower end of the brake cylinder 1, and the upper end by a fitting 9 with one only of the pipes 3, 4, 5 or 6. A nipple 10 is interposed between the fitting 9 and the upper end of the cylinder 7. A piston 11 is fitted to the cylinder, and preferably has its upper end ground to a taper 12 to fit the seat 13. A ball check-valve 14 actuated by a spring 15 controls the passage-way 16 through the piston.

Figure 4:
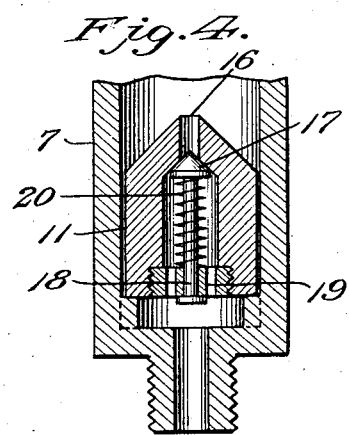
Fig. 4 shows a slightly different form of check-valve.

In the form shown in Fig. 4, the check-valve is in the form of a tapered plug 17 having a stem 18 which slides through the nut 19; and a spring 20 sleeved around the stem and pressing between the plug valve 17 and the nut 19 keeps the orifice 16 through the piston normally closed.

Figure 2:
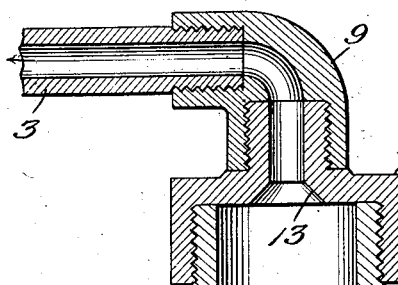
Fig. 2 is an enlarged section through one form of the check device.
Figure 3:
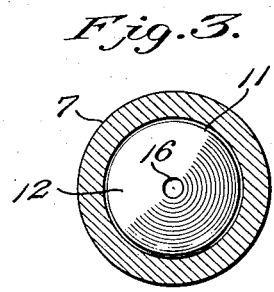
Fig. 3 is a horizontal section on line 3—3 of Fig. 2.

The cubical area or capacity of the cylinder 7 is in the neighborhood of a fourth greater than the cubical area of the brake mechanism to which it is connected, and the purpose of this is readily understood. This is to prevent the piston from seating itself on the seat 13 during the normal and proper working of the brake system, in other words, the advance of the piston under ordinary conditions of braking is never the full length of the cylinder 7, and it is understood that the water or oil or fluid which fills the entire braking system is always on both sides of the piston, or above and below the piston, and normally it might be said in equilibrium. Of course it is understood the cylinders 7 could be placed in different positions, for example horizontally, but they are shown and described as being vertical in order that the pistons may find their way back to normal by gravity as viewed in Figs. 2 and 4, thus making springs or other means for their return unnecessary.

When a break occurs in any one or more of the lines, the piston 11 (in that or those safety check devices, connected to that or those particular lines) immediately rises to the top and seats itself on seat 13 and remains there due to the fact that there is a pressure on the system even after the foot pressure has been released, because of the conventional retraction springs which pull the brake shoes clear of the brake drum.

Piston 11 is purposely fitted so as to permit a slight leakage past its side walls. This is done to permit the piston to remain in its normal position when there is a slight leakage in the brake mechanism to which it is attached. If this were not the case and the piston was absolutely oil tight, the piston in the event of slight leakage, as just mentioned, would work up to the top and cut off the normal functioning of the brake which is contrary to the purpose of this device which is so designed with a greater cubical content than the brake expanding mechanism that the seating of piston 11 on seat 13 is impossible except in the event of a break or leak of serious consequences in the line.

Valves 14 and 17 are for the purpose of permitting the fluid to flow back through the piston to the main source of supply in the event that the piston has settled to its normal position as shown, which will be the case after the pressure has been applied for a very long interval by reason of the fact that the pressure being equal on all sides of the piston, the piston necessarily fitting to a degree of slight leakage, the piston would then settle and cut off the return of the fluid when foot pressure is finally released. If it were not for the action of these valves 14 and 17, the return flow of the fluid is effected by the usual retraction springs on the brake bands.

From the foregoing, it will be seen that I have provided a simple means of fluid pressure brake control applicable to any braking system, especially of the hydraulic brake type, comprising few parts, perfect in operation and control, and automatic in its action in the event of an accident or break, thus precluding the possibility of accident due to failure of the brakes to work, as the breaking in one or more of the lines does not interfere with the automatic operation of the one or those remaining in contact, which is the desideratum and the purpose of this invention.

I claim:

1. A device of the character described including a main source of fluid supply, a check cylinder in communication therewith, a piston in said check cylinder having an orifice therethrough, and fluid pressure brake mechanism connected with said check cylinder.

2. A device of the character described including a main source of fluid supply, check cylinders in communication therewith, a piston in each of said check cylinders and having an orifice therethrough, and fluid pressure brake mechanism communicating with said main source of fluid supply through said check cylinder.

3. A device of the character described including a main source of fluid supply, check-cylinders in communication therewith, a piston in each check cylinder having an orifice therethrough, fluid pressure brake mechanisms, pipes extending from the main source of fluid supply to the fluid pressure brake mechanisms, the cubical area of each check cylinder being in excess of the cubical area of the brake mechanism to which it is connected.

4. A device of the character described including a main source of fluid supply, check-cylinders in communication therewith, a piston in each check cylinder, having a valve-controlled orifice therein, fluid pressure brake mechanism, pipes extending from the main source of fluid supply to the brake mechanisms, the cubical area of each check cylinder being in excess of the cubical area of the brake mechanism to which it is connected.

5. A device of the character described including a main source of fluid supply, check cylinders in communication therewith, a piston in each of said check cylinders, and having an orifice therethrough, a spring pressed valve for closing said orifice, fluid pressure brake mechanism, and pipes communicating with the main source of fluid supply and brake mechanism, said piston automatically cutting off fluid connection to said brake mechanism in the event of an abnormal drop of pressure therein.

In testimony whereof I affix my signature.

CLYDE E. LOOSE.